(12) United States Patent
Hoffman

(10) Patent No.: US 8,290,844 B2
(45) Date of Patent: *Oct. 16, 2012

(54) LIFE INSURANCE COOPERATIVE

(76) Inventor: Michael Richard Hoffman, Centerville, MD (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/824,847

(22) Filed: Jun. 28, 2010

(65) Prior Publication Data

US 2010/0268554 A1    Oct. 21, 2010

Related U.S. Application Data

(63) Continuation of application No. 12/053,337, filed on Mar. 21, 2008, now Pat. No. 7,747,496.

(51) Int. Cl.
*G06Q 40/00* (2006.01)
(52) U.S. Cl. .................. 705/35; 705/4; 705/36
(58) Field of Classification Search .............. 705/4, 35, 705/36
See application file for complete search history.

(56) References Cited

U.S. PATENT DOCUMENTS

| | | | |
|---|---|---|---|
| 4,718,009 A | 1/1988 | Cuervo | |
| 5,429,506 A * | 7/1995 | Brophy et al. | 434/107 |
| 5,752,236 A | 5/1998 | Sexton et al. | |
| 6,351,738 B1 | 2/2002 | Clark | |
| 6,456,979 B1 | 9/2002 | Flagg | |
| 7,249,040 B1 | 7/2007 | Binns et al. | |
| 7,324,950 B2 * | 1/2008 | Sherman | 705/4 |
| 2001/0047325 A1 | 11/2001 | Livingston | |
| 2002/0029158 A1 | 3/2002 | Wolff et al. | |
| 2002/0184052 A1 | 12/2002 | Parker | |
| 2003/0009355 A1 | 1/2003 | Gupta | |
| 2003/0074229 A1 * | 4/2003 | Heise et al. | 705/4 |
| 2003/0110061 A1 | 6/2003 | Lakenbach et al. | |
| 2003/0120521 A1 | 6/2003 | Sherman | |
| 2003/0144937 A1 | 7/2003 | Garella et al. | |
| 2003/0208385 A1 | 11/2003 | Zander et al. | |
| 2004/0176982 A1 | 9/2004 | Kilgore et al. | |
| 2005/0010439 A1 | 1/2005 | Short | |
| 2005/0038679 A1 | 2/2005 | Short | |
| 2005/0060209 A1 | 3/2005 | Hill et al. | |
| 2005/0102171 A1 | 5/2005 | Ashley et al. | |
| 2005/0114173 A1 | 5/2005 | Harris | |
| 2005/0144047 A1 | 6/2005 | Tran et al. | |
| 2005/0222867 A1 | 10/2005 | Underwood et al. | |
| 2005/0234742 A1 | 10/2005 | Hodgdon | |
| 2005/0234747 A1 | 10/2005 | Kavanaugh | |
| 2005/0288971 A1 | 12/2005 | Cassandra | |

(Continued)

OTHER PUBLICATIONS

Hoffman, Michael, Life Insurance Coop, web site, printed Jan. 28, 2008, http://www.lifeinsurancecoop.com.

*Primary Examiner* — Nga B. Nguyen
(74) *Attorney, Agent, or Firm* — Kenneth P. Waszkiewicz, Attorney at Law

(57) ABSTRACT

A method and computing system that receives a payment for each participant in a group of participants, and associates the payments with a time period to create a fund for the time period. The method identifies deceased participants in the group of participants who died during the time period, calculates a portion of the fund to disburse to each deceased participant; and disburses the portion of the fund to each deceased participant. When the participant is one of the deceased participants, the portion of the fund to disburse to the participant is a death benefit for the participant.

20 Claims, 5 Drawing Sheets

U.S. PATENT DOCUMENTS

| | | |
|---|---|---|
| 2006/0026045 A1 | 2/2006 | Rothschild |
| 2006/0111996 A1 | 5/2006 | Landry |
| 2006/0155590 A1 | 7/2006 | Graham |
| 2006/0241982 A1 | 10/2006 | Seifert et al. |
| 2007/0016455 A1 | 1/2007 | Ryan et al. |
| 2007/0021987 A1 | 1/2007 | Binns et al. |
| 2007/0050218 A1 | 3/2007 | Fitzsimmons et al. |
| 2007/0055601 A1* | 3/2007 | Inderski et al. ............. 705/36 R |
| 2007/0203756 A1 | 8/2007 | Sears et al. |

* cited by examiner

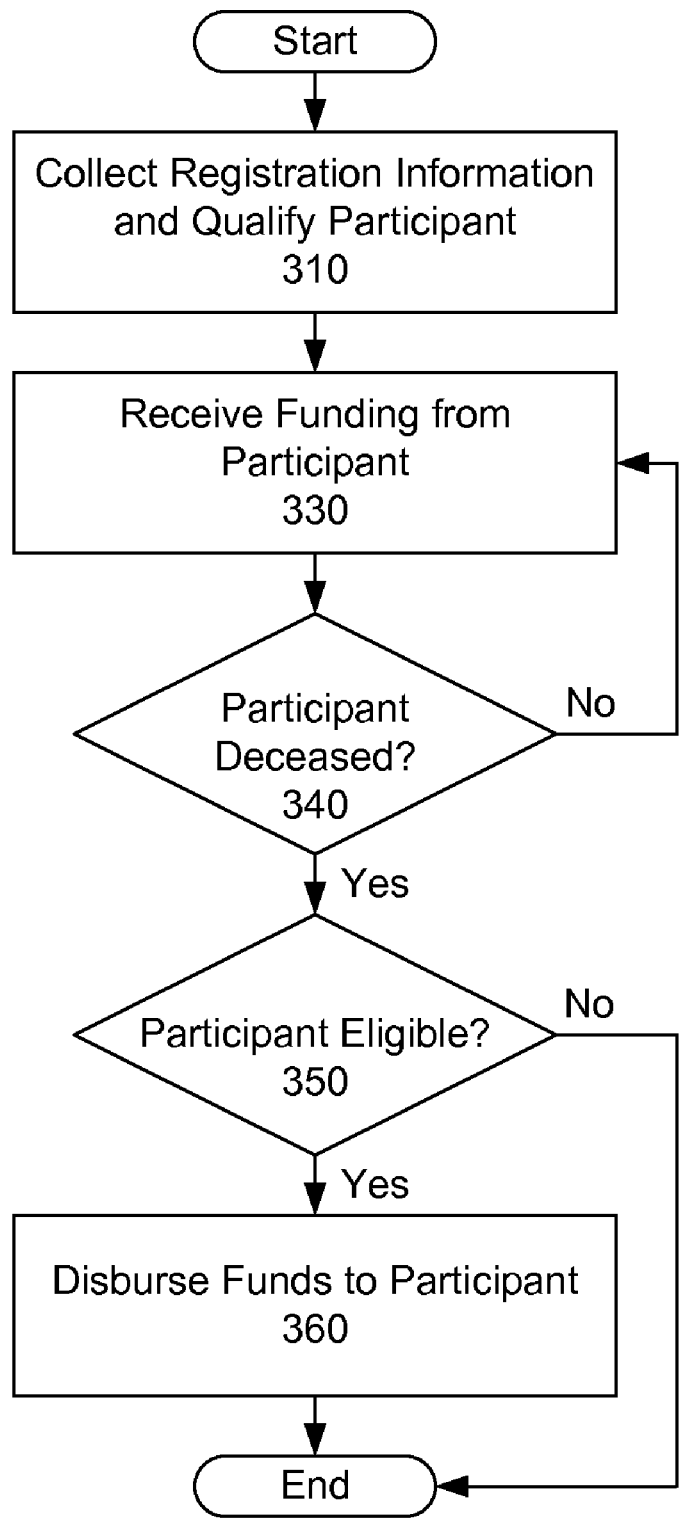

US 8,290,844 B2

LIFE INSURANCE COOPERATIVE

This application is a continuation of U.S. patent application Ser. No. 12/053,337, filed on Mar. 21, 2008, status allowed.

BACKGROUND OF THE INVENTION

1. Field of the Invention

The present invention relates, in general, to the field of life insurance. In particular, the present invention is a business method and computing system for providing a death benefit to an individual having an uninsurable trait.

2. Description of the Related Art

An insurance policy is a contract between an insurer and a policy owner, typically also the insured. The insurer agrees to pay a sum of money to a beneficiary designated by the policy owner upon the occurrence of an insured event. When the insurance policy is a life insurance policy, the insured event is typically the death of the policy owner from an accident or sickness, and typically excludes suicide, fraud, war, riot, and civil commotion. In return, the policy owner agrees to pay a premium to the insurer either at regular intervals or in a lump sum.

The insurer calculates the premium by evaluating the risk of insuring the policy owner. The evaluation typically includes an investigation of the health, lifestyle, and family history of the policy owner in conjunction with mortality tables. If the evaluation indicates that the risk of insuring the policy owner is minimal, the premium will likely be affordable. If the evaluation indicates that the risk of insuring the policy owner exceeds the risk the insurer is willing to accept, the premium will likely be unaffordable for the policy owner, and, in some cases, the insurer may deny coverage. In either case, the only alternative for the policy owner is not to have a life insurance policy.

Thus, there is a demand for a method for providing a death benefit to an individual having an uninsurable trait. The presently disclosed method and system satisfies this demand.

SUMMARY OF THE INVENTION

A business method and computer system for providing a death benefit to a participant having an uninsurable trait. The method collects registration information from the participant, and associates the participant with at least one other participant having the uninsurable trait to form a group of participants. In one embodiment, the method collects personal information, contact information, uninsurable trait information, and previous insurance coverage information from the participant by sending a request for the registration information to the participant, and receiving and storing the registration information. The method analyzes the registration information to determine whether the participant qualifies to receive the death benefit and the group to associate with the participant. In one embodiment, the participant has the option to request a coverage amount to receive as the death benefit or to request a funding payment.

The method receives a funding payment from each participant in the group to create a funding pool for a time period, and stores the amount of the funding payment received from each participant in the group. The method disburses the funding pool to deceased participants in the group who died during the time period, each deceased participant receiving a portion of the funding pool. In one embodiment, the method disburses the funding pool to each eligible deceased participant. In various embodiments, the deceased participant is eligible after remitting the funding payment for the time period in which he died, the time period in which he died and a number funding payments for prior time periods, and the time period in which he died and a number funding payments for prior consecutive time periods. In various other embodiments, the deceased participant is eligible if the cause of death is the uninsured trait associated with the group of similarly situated participants of which the deceased participant was a member, and for any cause of death except and excluded cause of death. In various embodiments, the amount of the funding pool that each deceased participant receives is proportional to the funding payment received from each deceased participant for the time period in which they died, an average of the funding payments received from each deceased participant over a number of prior time periods, an average of the funding payments received from each deceased participant for the time period in which they died and a number of prior time periods, and an average of the funding payments received from each deceased participant for the time period in which they died and a number of prior consecutive time periods. The amount of the portion of the funding pool for each deceased participant is the death benefit for the deceased participant.

In one embodiment, the uninsurable trait includes a health condition or lifestyle risk. The health condition includes illnesses such as cancer, diabetes, HIV/AIDS, hepatitis, heart disease, or the like, a diagnosis of cancer in remission, and a terminal illness. The lifestyle risk includes conditions such as obesity, smoking, or the like, a high risk occupation such as law enforcement, military, or the like, and a high-risk activity such as rock climbing, mountaineering, base jumping, or the like.

BRIEF DESCRIPTION OF THE DRAWINGS

FIGS. 3A, 3B, 3C, and 3D are flow charts that illustrate an exemplary embodiment of the method performed by the life insurance cooperative program 232 shown in FIG. 2.

DETAILED DESCRIPTION OF THE INVENTION

Figure 1:
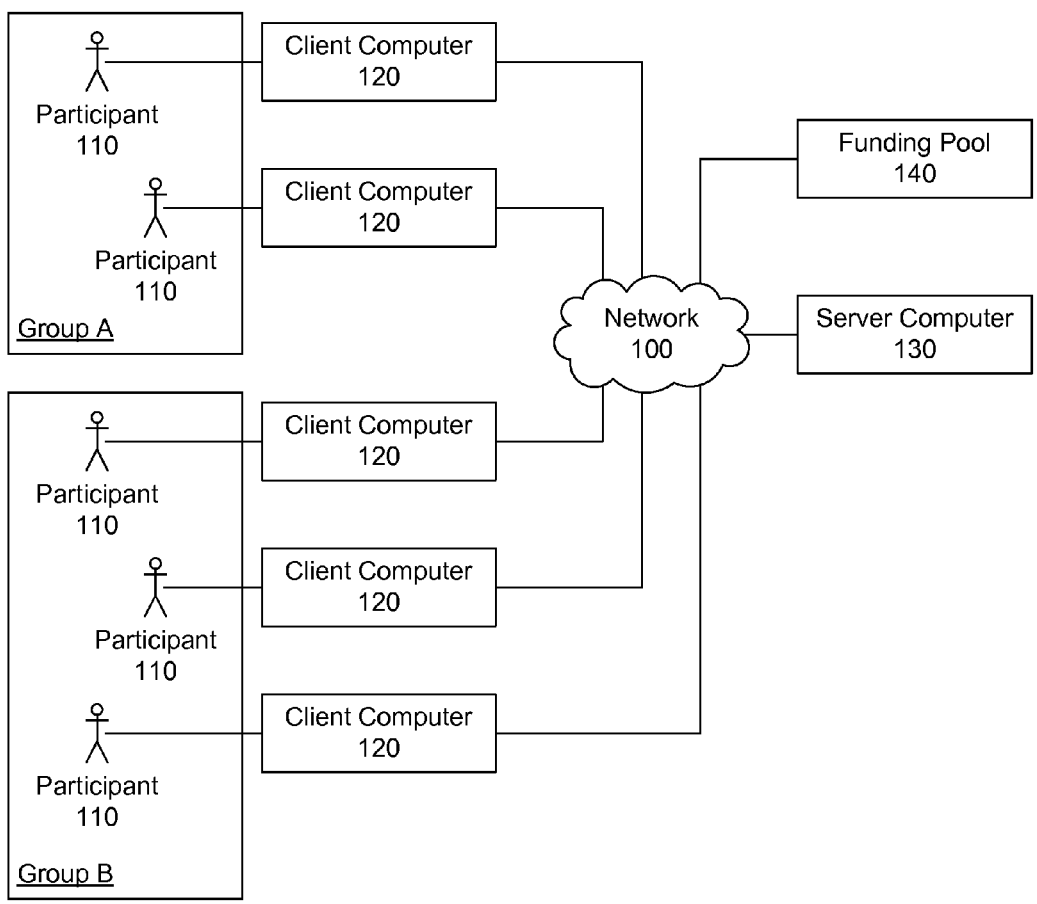
FIG. 1 is a network diagram that illustrates an exemplary embodiment of the hardware components of a system that performs the present invention.

FIG. 1 is a network diagram that illustrates an exemplary embodiment of the hardware components of a system that performs the present invention. The architecture shown in FIG. 1 utilizes a network 100 to connect a number of client computers 120 to a single server computer 130 that performs the method of the present invention. In another embodiment, the processing performed by the server computer 130 is distributed among a number of server computers. In yet another embodiment, the processing performed by the server computer 130 is distributed among a combination of a server computer and a number of general-purpose computers. In yet another embodiment, the processing performed by the server computer 130 is distributed among the client computers 120 and the server computer 130.

The network 100 shown in FIG. 1, in an exemplary embodiment, is a public communication network that connects and enables data transfer between the client computers 120 and the server computer 130. The present invention also contemplates the use of comparable network architectures. Comparable network architectures include the Public Switched Telephone Network (PSTN), a public packetswitched network carrying data and voice packets, a wireless network, and a private network. A wireless network includes a cellular network (e.g., a Time Division Multiple Access (TDMA) or Code Division Multiple Access (CDMA) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

As shown in FIG. 1, participants 110 operate the client computers 120 to access the network 100 and connect to the server computer 130. Each participant 110 registers with the server computer 130. If the participant 110 satisfies qualification criteria, the server computer 130 creates a unique identifier for the participant 110, and groups the participant 110 with other similarly situated participants 110. FIG. 1 illustrates two groups of similarly situated participants 110, Group A, and Group B. As illustrated in Group A, the two participants 110 are similarly situated participants 110 because they have a trait, such as, a health condition or a lifestyle risk, in common that prevents them from obtaining a life insurance policy. As illustrated in Group B, the three participants 110 are similarly situated participants 110 because they have a trait, such as, a health condition or a lifestyle risk, in common that prevents them from obtaining a life insurance policy. The health condition includes illnesses such as cancer, diabetes, HIV/AIDS, hepatitis, heart disease, or the like, cancer in remission, and terminal illnesses. The lifestyle risk includes conditions such as obesity, smoking, or the like, high-risk occupations, and high-risk activities. In one embodiment, the server computer 130 may associate with the qualifying participant 110 a desired death benefit, or coverage amount, for the participant 110. In another embodiment, the server computer 130 may associate with the qualifying participant 110 a funding payment, or commitment amount, that the participant 110 is willing to pay on a periodic basis.

FIG. 1 also illustrates that the network 100 connects to a funding pool 140. The funding pool 140 is a financial institution, or depository, that receives the funding payment from the participants 110 on a periodic basis. As shown in FIG. 1, the connection between the server computer 130 and the funding pool 140 is via the network 100. In another embodiment, the connection between the server computer 130 and the funding pool 140 is a direct connection. In yet another embodiment, the server computer 130 includes the funding pool 140.

Figure 2:
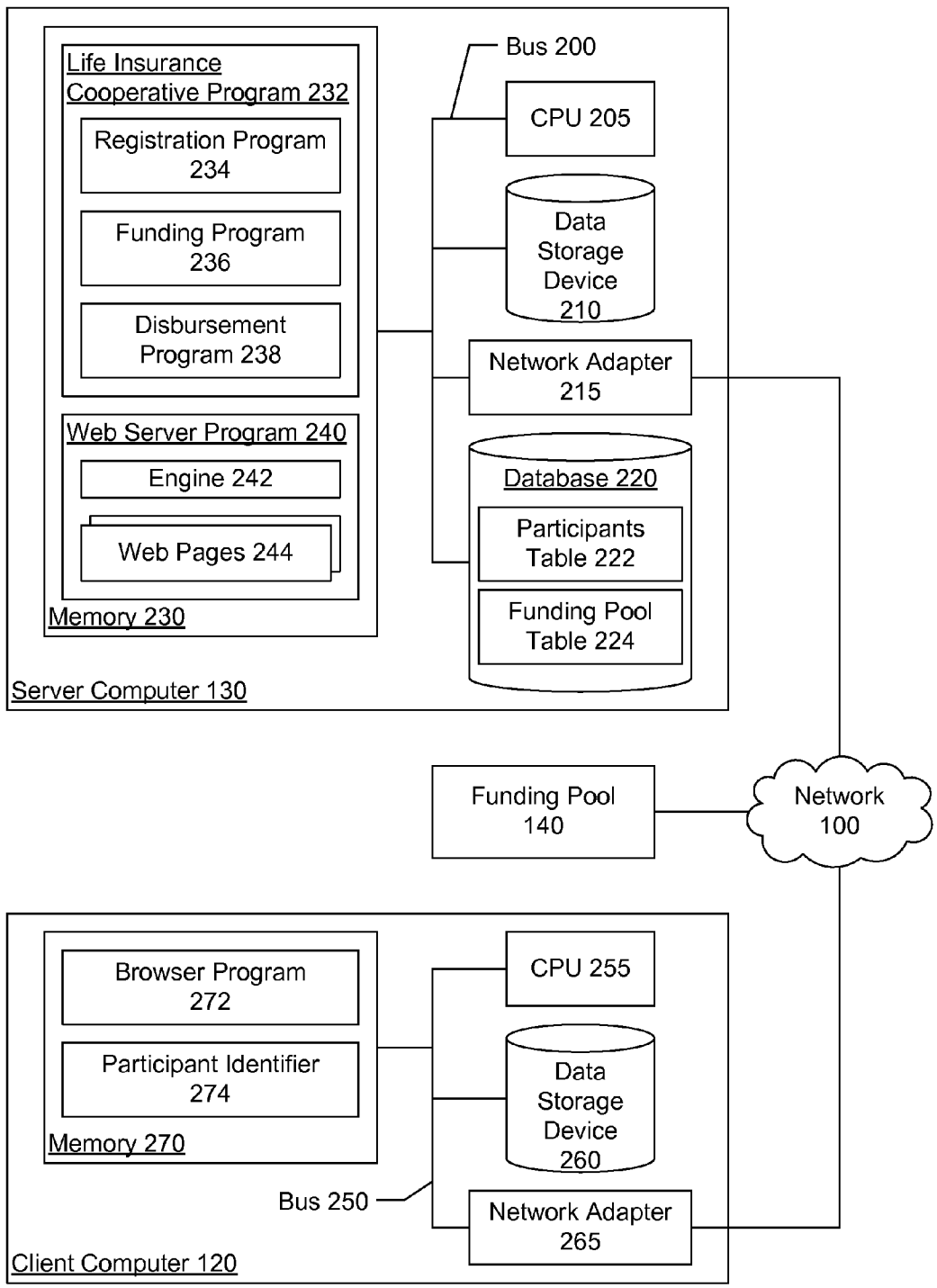
FIG. 2 is a block diagram that illustrates, in greater detail, an exemplary embodiment of the hardware components shown in FIG. 1.

FIG. 2 is a block diagram that illustrates, in greater detail, an exemplary embodiment of the hardware components shown in FIG. 1. In particular, FIG. 2 illustrates, in greater detail, the hardware and software components that comprise the server computer 130 and the client computer 120.

The server computer 130 shown in FIG. 2 is a general-purpose computer that provides server functionality including file services, web page services, and the like. A bus 200 is a communication medium that connects a central processor unit (CPU) 205, data storage device 210, network adapter 215, database 220, and memory 230. The network adapter 215 also connects to the network 100 and is the mechanism that facilitates the passage of network traffic between the server computer 130 and the network 100.

The database 220 is a collection of data organized in such a way that a database management system can quickly store, modify, and extract the data from the database 220. In one embodiment, the collection of data for the database 220 includes a participants table 222 for storing data related to each participant 110, and a funding pool table 224 for storing data related to the funding provided by each participant 110. The participants table 222 includes a record for each participant, the record including a participant identifier, uninsurable trait, group identifier, requested coverage amount, requested funding payment, eligibility indicator, and deceased indicator. The funding pool table 224 includes a record for each funding payment received from a participant, the record including a participant identifier, group identifier, time period identifier, funding payment, pool value, and disbursement amount due. The database management system may employ a relational, flat, hierarchical, object-oriented architecture, or the like.

The CPU 205 performs the disclosed methods by executing the sequences of operational instructions that comprise each computer program resident in, or operative on, the memory 230. It is to be understood that the memory 230 may include operating system, administrative, and database programs that support the programs disclosed in this application. In one embodiment, the configuration of the memory 230 of the server computer 130 includes a life insurance cooperative program 232, and web server program 240. The life insurance cooperative program 232 includes a registration program 234, funding program 236, and disbursement program 238. The web server program 240 includes an engine 242, and web pages 244. These computer programs store intermediate results in the memory 230, database 220, or data storage device 210. These programs also receive input from the participants 110, access the database 220, and display the results to the participants 110. In another embodiment, the memory 230 may swap these programs, or portions thereof, in and out of the memory 230 as needed, and thus may include fewer than all of these programs at any one time.

The engine 242 of the web server program 240 receives requests such as hypertext transfer protocol (HTTP) requests from the client computers 120 to access the web pages 244 identified by uniform resource locator (URL) addresses and provides the web pages 244 in response. The requests include a registration request that triggers the server computer 130 to execute the registration program 234, a funding request that triggers the server computer 130 to execute the funding program 236, and a disbursement request that triggers the server computer 130 to execute the disbursement program 238.

As shown in FIG. 2, the client computer 120 is a general-purpose computer. A bus 250 is a communication medium that connects a central processor unit (CPU) 255, data storage device 260, network adapter 265, and memory 270. The network adapter 265 also connects to the network 100 and is the mechanism that facilitates the passage of network traffic between the client computer 120 and the network 100.

The CPU 255 performs the disclosed methods by executing the sequences of operational instructions that comprise each computer program resident in, or operative on, the memory 270. It is to be understood that the memory 270 may include operating system, administrative, and database programs that support the programs disclosed in this application. In one embodiment, the configuration of the memory 270 of the client computer 120 includes a browser program 272, and a participant identifier 274. The participant identifier 274 is stored in a file referred to as a cookie. The server computer 130 may assign and send the participant identifier 274 to the client computer 120 once when the client computer 120 first communicates with the server computer 130. From then on, the client computer 120 includes its participant identifier 274 with all messages sent to the server computer 130 so the server computer 130 can identify the source of the message. These computer programs store intermediate results in the memory 270, or data storage device 260. In another embodiment, the memory 270 may swap these programs, or portions thereof, in and out of the memory 270 as needed, and thus may include fewer than all of these programs at any one time.

FIGS. 3A, 3B, 3C, and 3D are flow charts that illustrate an exemplary embodiment of the method performed by the life insurance cooperative program 232 shown in FIG. 2. The participant 110 initiates the execution of the life insurance cooperative program 232 by accessing the web pages 244 stored on the server computer 130. The method shown in FIG. 3A begins by collecting registration information and qualifies the participant 110 (step 310). The method then receives a funding payment from the participant 110 for a time period (step 330). In one embodiment, the time period is a calendar month and the method receives the funding payment from the participant 110 before the calendar month. After each time period, the method determines whether the participant 110 died during the time period (step 340). If the participant 110 did not die during the time period (step 340, No branch), the method iterates to receive the funding payment from the participant 110 for the next time period (step 330). If the participant 110 died during the time period (step 340, Yes branch), the method determines whether the participant 110 is eligible to receive a disbursement (step 350). If the participant 110 is not eligible to receive a disbursement (step 350, No branch), the method ends. If the participant 110 is eligible to receive a disbursement (step 350, Yes branch), the method disburses the funds, or a portion thereof, to the deceased, eligible participant 110 (step 360). In one embodiment, the participant 110 is immediately eligible to receive a disbursement, that is, he is eligible because he made the funding payment for the time period in which he died. In another embodiment, a deceased participant 110 is eligible to receive a disbursement because he made the funding payment for the time period in which he died and a number of funding payments for prior time periods. In yet another embodiment, a deceased participant 110 is eligible to receive a disbursement because he made the funding payment for the time period in which he died and a number of funding payments for prior consecutive time periods. For example, if the funding payments are paid monthly, in one exemplary embodiment, the participant 110 is eligible after making six consecutive funding payments (i.e., the current month and the previous five months). In another embodiment, the deceased participant 110 is eligible to receive a disbursement if a cause of death for the deceased participant 110 is the uninsurable trait associated with the group of similarly situated participants 110 of which the deceased participant 110 was a member. In yet another embodiment, the deceased participant 110 will be eligible for any cause of death except an excluded cause of death such as suicide, fraud, war, riot, civil commotion, or the like.

Figure 3B:
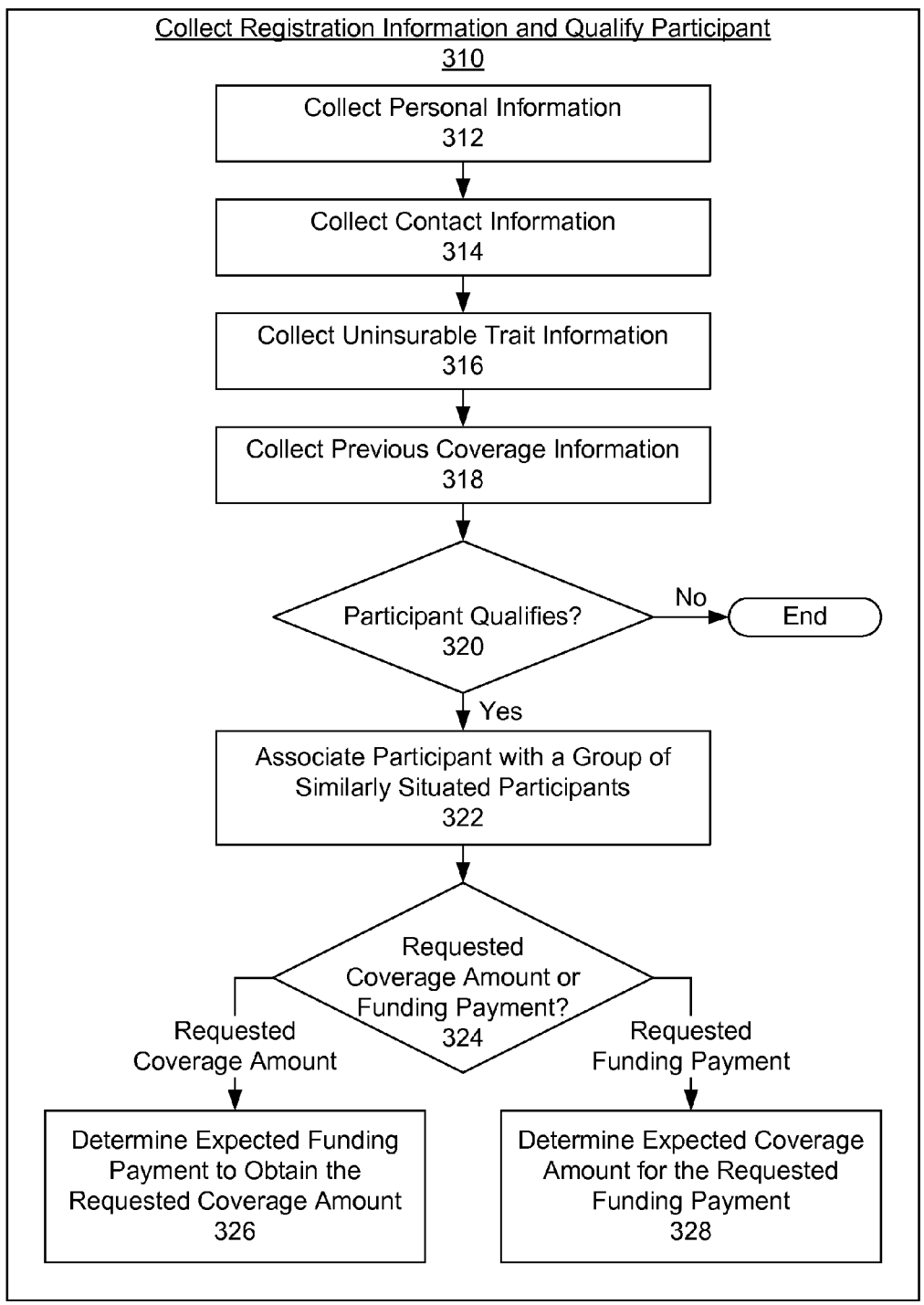

FIG. 3B is a flow chart that illustrates, in greater detail, the collection of registration information and qualification of the participant 110 (step 310) shown in FIG. 3A. The flow chart shown in FIG. 3B also illustrates an exemplary embodiment of the method performed by the registration program 234 shown in FIG. 2. The method shown in FIG. 3B begins by collecting registration information from the participant 110. The collection of the registration information includes collection of personal information (step 312), collection of contact information (step 314), collection of uninsurable trait information (step 316), and collection of previous coverage information (step 318). The personal information includes information such as the participants 110 first name, last name, date of birth, gender, whether he accepts the terms and conditions, and the like. The contact information includes information such as the participants 110 username, password, address, phone number, e-mail address, and the like. The uninsurable trait information includes information such as the participants 110 health conditions, lifestyle risks, and the like. The previous coverage information includes information such as the participants 110 requested amount of coverage, requested amount of funding payment, whether he was previously denied coverage for a life insurance policy and the reason for the denial, and the like. One exemplary means for collecting the registration information is the web pages 244 stored on the server computer 130. The client computer 120 sends a web page request to the server computer 130. In response, the client computer receives the web pages 244 that it displays to the participant 110. The participant 110 enters the registration information on the web pages 244, and uses a control means such as a button to send the registration information to the server computer 130 where it is stored in the data storage device 210, database 220, memory 230, or any combination thereof. The method then determines whether the participant qualifies to receive the death benefit (step 320). In one embodiment, the method determines whether the participant 110 qualifies by analyzing the registration information. The analysis includes determining whether the participant 110 has an uninsurable trait, whether an insurer previously denied the participant 110 coverage for a life insurance policy, and whether the number of similarly situated participants 110 provides a sufficient death benefit for the participant 110. If the participant 110 does not qualify (step 320, No branch), the method ends. If the participant 110 qualifies (step 320, Yes branch), the method associates the participant with a group of similarly situated participants 110 (step 322). In one embodiment, the participant 110 is associated with only one group of similarly situated participants 110 even though the participant 110 may have a number of uninsurable traits. In another embodiment, the participant 110 is associated with a number of groups of similarly situated participants 110. In yet another embodiment, every participant 110 regardless of their uninsurable trait is associated with one group, that is, every participant 110 is similarly situated because they have an uninsurable trait. The method then determines whether the participant 110 is providing a requested coverage amount or a requested funding payment (step 324). If the participant 110 provides a requested coverage amount (step 324, Requested Coverage Amount branch), the method determines the expected funding payment for the participant 110 to pay to obtain the requested coverage amount (step 326). If the participant 110 provides a requested funding payment (step 324, Requested Funding Payment branch), the method determines the expected coverage amount that the participant 110 may obtain by paying the requested funding payment (step 328).

Figure 3C:
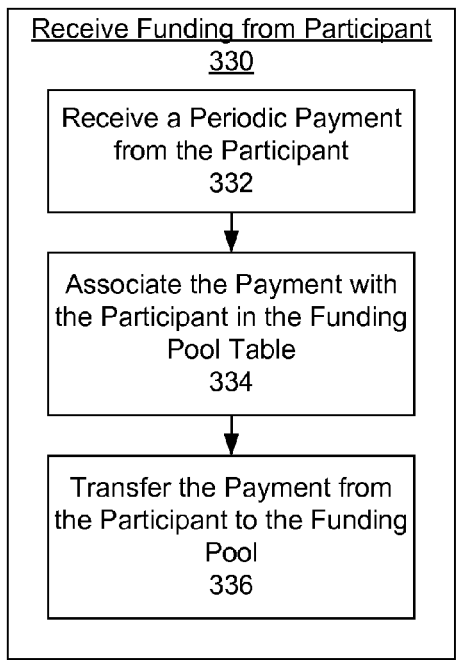

FIG. 3C is a flow chart that illustrates, in greater detail, the receipt of funding from the participant 110 (step 330) shown in FIG. 3A. The flow chart shown in FIG. 3C also illustrates an exemplary embodiment of the method performed by the funding program 236 shown in FIG. 2. The participant 110 initiates the execution of the funding program 236 by sending a funding request via the network 100 to the server computer 130. The method shown in FIG. 3C begins by receiving a periodic payment from a participant 110 (step 332) via an electronic funds transfer, credit card transaction, check, or the like. The method then associates the payment with the participant 110 in the funding pool table 224 of the database 220 (step 334). The method then transfers the payment from the participant 110 to the funding pool 140 (step 336).

Figure 3D:
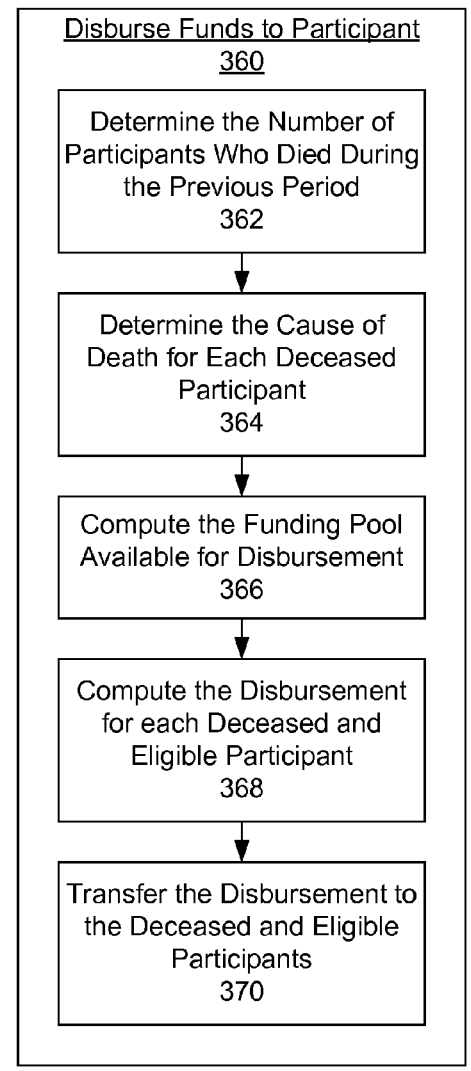

FIG. 3D is a flow chart that illustrates, in greater detail, the disbursing of funds to the participant 110 (step 360) shown in FIG. 3A. The flow chart shown in FIG. 3D also illustrates an exemplary embodiment of the method performed by the disbursement program 238 shown in FIG. 2. The participant 110 initiates the execution of the disbursement program 238 by sending a disbursement request via the network 100 to the server computer 130. The method shown in FIG. 3D begins by determining the number of participants who died during the previous period (step 362). The method then determines the cause of death for each deceased participant (step 364). In one embodiment, each deceased participant is eligible only if the documented cause of death is the health condition or lifestyle risk that defined the group of similarly situated participants 110 of which the deceased participant 110 was a member. In another embodiment, each deceased participant is eligible unless the documented cause of death is an excluded cause of death, such as, suicide, fraud, war, riot, civil commotion, or the like. The method then computes the funding pool available for disbursement (step 366). In one embodiment, the funding pool available for disbursement is the sum of the funding payments made by participants in the group during the previous period, less any operating costs to implement the life insurance cooperative. The method then computes the portion of the funding pool to disburse to each deceased and eligible participant 110 (step 368). In one embodiment, the computation of the disbursement for each deceased and eligible participant 110 is proportional to the funding payment received from each deceased participant 110 for the time period in which they died. In another embodiment, the computation of the disbursement for each deceased and eligible participant 110 is proportional to an average of the funding payments received from each deceased and eligible participant 110 over a number of prior time periods. In yet another embodiment, the computation of the disbursement for each deceased and eligible participant 110 is proportional to an average of the funding payments received from each deceased and eligible participant 110 for the time period in which they died and a number of prior time periods. In yet another embodiment, the computation of the disbursement for each deceased and eligible participant 110 is proportional to an average of the funding payments received from each deceased and eligible participant 110 for the time period in which they died and a number of prior consecutive time periods. For example, if funding payments are received monthly, the disbursement for a deceased and eligible participant 110 is the pro-rated share of the funding pool available based on the average funding payment for the deceased and eligible participant 110 for the current month and the previous five months. The method then transfers the computed disbursement to each deceased and eligible participant 110 (step 370).

Although the disclosed exemplary embodiments describe a fully functioning business method and computing system for providing a death benefit to an individual having an uninsurable trait, the reader should understand that other equivalent exemplary embodiments exist. Since numerous modifications and variations will occur to those reviewing this disclosure, the business method and computing system for providing a death benefit to an individual having an uninsurable trait is not limited to the exact construction and operation illustrated and disclosed. Accordingly, this disclosure intends all suitable modifications and equivalents to fall within the scope of the claims.

I claim:
1. A method, comprising:
  receiving a payment for each participant in a group of participants;
  associating the payments with a time period;
  creating a fund for the time period, where the fund is a designated portion of a sum of the payments;
  identifying deceased participants in the group of participants who died during the time period;
  calculating, on a computer, a portion of the fund to disburse to each deceased participant; and
  disbursing the fund to the deceased participants, where the portion of the fund to disburse to each deceased participant is a share of the fund.
2. The method of claim 1, further comprising:
  qualifying each participant to receive a death benefit.
3. The method of claim 2, wherein the qualifying of each participant is based on the receiving of the payment for each participant.
4. The method of claim 2, wherein the qualifying of each participant further comprises:
  receiving registration information for each participant, the registration information including personal information, contact information, uninsurable trait information, and previous insurance coverage information;
  storing the registration information for each participant in the computer; and
  analyzing the registration information for each participant to determine whether each participant qualifies to receive the death benefit.
5. The method of claim 4, wherein the uninsurable trait information includes a health condition or a lifestyle risk, the health condition including cancer, diabetes, HIV/AIDS, hepatitis, heart disease, a diagnosis of cancer in remission, and a terminal illness, and the lifestyle risk including obesity, smoking, a high risk occupation including law enforcement, or military, and a high-risk activity including rock climbing, mountaineering, or base jumping.
6. The method of claim 1, wherein the identifying of the deceased participants further comprises:
  receiving a notification of death for each deceased participant.
7. The method of claim 1, wherein the calculating of the portion of the fund to disburse to each deceased participant is based on the payment associated with the time period for the deceased participant.
8. The method of claim 1, wherein the calculating of the portion of the fund to disburse to each deceased participant is based on an average payment for the deceased participant, computed over a number of time periods.
9. The method of claim 1, wherein when the participant is one of the deceased participants, the portion of the fund to disburse to the participant is a death benefit for the participant.
10. A computing system, comprising:
  a memory device resident in the computing system; and
  a processor disposed in communication with the memory device, the processor configured to:
    receive a payment for each participant in a group of participants;
    associate the payments with a time period;

create a fund for the time period, where the fund is a designated portion of a sum of the payments;

identify deceased participants in the group of participants who died during the time period;

calculate, on a computer, a portion of the fund to disburse to each deceased participant; and disburse the fund to the deceased participants, where the portion of the fund to disburse to each deceased participant is a share of the fund.

11. The computing system of claim 10, wherein the processor is further configured to:

qualify each participant to receive a death benefit.

12. The computing system of claim 11, wherein the qualifying of each participant is based on the receiving of the payment for each participant.

13. The computing system of claim 11, wherein to qualify each participant, the processor is further configured to:

receive registration information for each participant, the registration information including personal information, contact information, uninsurable trait information, and previous insurance coverage information;

store the registration information for each participant in the computer; and analyze the registration information for each participant to determine whether each participant qualifies to receive the death benefit.

14. The computing system of claim 13, wherein the uninsurable trait information includes a health condition or a lifestyle risk, the health condition including cancer, diabetes, HIV/AIDS, hepatitis, heart disease, a diagnosis of cancer in remission, and a terminal illness, and the lifestyle risk including obesity, smoking, a high risk occupation including law enforcement, or military, and a high-risk activity including rock climbing, mountaineering, or base jumping.

15. The computing system of claim 10, wherein to identify the deceased participants, the processor is further configured to:

receive a notification of death for each deceased participant.

16. The computing system of claim 10, wherein the calculating of the portion of the fund to disburse to each deceased participant is based on the payment associated with the time period for the deceased participant.

17. The computing system of claim 10, wherein the calculating of the portion of the fund to disburse to each deceased participant is based on an average payment for the deceased participant, computed over a number of time periods.

18. The computing system of claim 10, wherein when the participant is one of the deceased participants, the portion of the fund to disburse to the participant is a death benefit for the participant.

19. A computer-readable medium, comprising computer-executable instructions that, when executed on a computing device, perform steps of:

receiving a payment for each participant in a group of participants;

associating the payments with a time period;

creating a fund for the time period, where the fund is a designated portion of a sum of the payments;

identifying deceased participants in the group of participants who died during the time period;

calculating, on a computer, a portion of the fund to disburse to each deceased participant; and disbursing the fund to the deceased participants, where the portion of the fund to disburse to each deceased participant is a share of the fund.

20. The computer-readable medium of claim 19, further comprising:

qualifying each participant to receive a death benefit.

* * * * *